United States Patent
Lawson

[11] Patent Number: 5,637,789
[45] Date of Patent: Jun. 10, 1997

[54] FLUID LEAK DETECTOR

[76] Inventor: William J. Lawson, P.O. Box 711, Poteet, Tex. 78065

[21] Appl. No.: 536,953

[22] Filed: Sep. 29, 1995

[51] Int. Cl.$^6$ .................................................. G01M 3/28
[52] U.S. Cl. ................................. 73/40.5 R; 340/606
[58] Field of Search ........................ 73/40.5 R, 49.1, 73/202.5, 204.18, 204.24, 204.11, 204.12, 204.14, 204.17, 204.19; 340/605, 606

[56] References Cited

U.S. PATENT DOCUMENTS

| | | | |
|---|---|---|---|
| 3,154,651 | 10/1964 | McKown | 200/82 |
| 3,372,590 | 3/1968 | Sterling | 73/204.17 |
| 3,443,434 | 5/1969 | Baker et al. | 73/202.5 |
| 3,535,927 | 10/1970 | Mahon et al. | 73/204.17 X |
| 3,864,960 | 2/1975 | Fletcher et al. | 73/46 |
| 3,874,222 | 4/1975 | Ladd et al. | 73/40.5 |
| 3,896,850 | 7/1975 | Waltrip | 137/554 |
| 4,259,861 | 4/1981 | Yamamoto et al. | 73/40.5 |
| 4,336,708 | 6/1982 | Hobgood et al. | 73/40.5 |
| 4,350,176 | 9/1982 | Lace | 137/242 |
| 4,468,609 | 8/1984 | Schmitz | 324/61 |
| 4,529,974 | 7/1985 | Tanaka et al. | 340/605 |
| 4,534,662 | 8/1985 | Barlian | 374/4 |
| 4,736,763 | 4/1988 | Britton et al. | 73/40.5 R X |
| 4,797,666 | 1/1989 | Baxter et al. | 340/606 |
| 5,062,442 | 11/1991 | Stenstrom et al. | 73/202.5 X |
| 5,121,929 | 6/1992 | Cobb | 277/2 |
| 5,190,069 | 3/1993 | Richards | 137/312 |
| 5,377,529 | 1/1995 | Boyd | 340/606 X |
| 5,493,100 | 2/1996 | Renger | 73/204.18 X |
| 5,568,825 | 10/1996 | Faulk | 137/624.11 |

FOREIGN PATENT DOCUMENTS

| | | | |
|---|---|---|---|
| 0201832 | 12/1982 | Japan | 73/40.5 R |
| 0085130 | 5/1983 | Japan | 73/40.5 R |

*Primary Examiner*—Michael Brock
*Attorney, Agent, or Firm*—Gunn, Lee & Miller, P.C.

[57] ABSTRACT

A downstream leak detection system for use with pipeline systems, especially those of residential type, is disclosed. The system makes use of a single thermistor, or other sensing element, to detect extraneous fluid flow via thermal transport. The leakage rate may be set over a wide range, and an alarm is activated when the desired leak flow rate is detected over a predetermined time interval.

7 Claims, 2 Drawing Sheets

FLUID LEAK DETECTOR

BACKGROUND OF THE INVENTION

1. Field of the Invention

This invention relates generally to an apparatus for detecting fluid leakage from a piping system. More particularly, the present invention relates to a piping system leakage detection apparatus which can be easily adjusted to monitor various rates of leakage downstream from the sensor. This invention has particular application to leak detection for residential water pipeline systems.

2. Description of the Related Art

Leakage is most apt to occur at two points in the lifetime of a piping system. Immediately after installation, a newly-installed piping system may be subject to mistakes in assembly, fitting problems, or simple infant mortality failures due to poor quality control. At the other end of the piping system life cycle, long use or external influences, such as shifting terrain, will eventually produce cracks, splits, and interstice in the piping system and attached accessories, such as valves, resulting in leakage of fluids through the cracks. In either case, leakage results in loss of the fluid, and possible danger to the public.

To deal with such a problem various devices and methods for detecting fluid leaks have been proposed. Most are complicated in nature and difficult to install. Furthermore, application of these devices is generally limited by specific environmental conditions. Other types of detection apparatus are limited in usefulness because their sensors must be placed in proximity to a suspected leak location. Therefore, if the leak does not occur near the sensor, it will remain undetected.

Some examples of the prior art include U.S. Pat. No. 3,874,222, issued to Ladd et al., for a pipeline leak detector, which makes use of temperature sensors placed along the length of a pipeline to detect leaks. This invention depends on the pipeline carrying a thermally unstable material, which is defined as material which, if released from the pipeline, would be at a temperature significantly different from that of the material surrounding the pipeline. The temperature sensing devices must be spaced close enough together along the line so that leaking material will not escape undetected. These sensors must also be positioned about the circumference of the pipeline so that, for example, if the pipeline carries gas and leaks in an upward direction, the sensors will not miss the escaping material. Similarly, if the leaking material is a liquid that tends to seep into the ground via gravity, then the temperature sensing elements must be located beneath the pipeline. This invention suffers from the requirement of sensor placement being sensitive to the actual location of the leak.

Another invention is disclosed by U.S. Pat. No. 3,864,960, issued to Fletcher et al., for an apparatus which monitors the integrity of vacuum seals. Its operation depends on the use of two matched thermistors. Each is mounted in a thermal cell, one exposed to the vacuum for reference, and the other exposed to both the vacuum and a detector chamber adjacent the seal being monitored. This invention suffers from dependence on a matched pair of sensors for leak detection.

U.S. Pat. No. 4,259,861, issued to Yamamoto et al., discloses a leak detector which is specifically directed toward the leakage of a substance, such as sodium, which will impinge on the sensor, while losing a good deal of its inherent heat to vaporization. The invention is aimed at counting individual particles of sodium, or in the alternative, toward measuring the total weight of sodium which has leaked out of the system. Such a device is not well suited to the detection of fluid leakage, but rather, to the detection of particles in a mist.

Other inventions, such as that disclosed by U.S. Pat. No. 4,336,708, issued to Hobgood et al., deal with the absolute location of leaks within a system. In this case, a portion of leaking pipe must be excavated before the invention can be applied. The instant invention is not directed toward the precise location of a leak, but rather, to the detection of a "leaking" condition as opposed to a "non-leaking" condition, somewhere in the system.

Finally, the invention disclosed by U.S. Pat. No. 4,529,974, issued to Tanaka et al. discloses a complex apparatus for leak detection which relies on a heated bridge element whose resistance will vary if subjected to the presence of leaking fluid. Again, this system depends on the proximity of the sensor itself to leaking fluid. If the fluid travels in a direction away from the sensor, the leak will never be detected.

Leak detection apparatus disclosed by the prior art tend to be complex, which makes them commercially impractical, or directed toward precise location of the leak itself, and not to simply detecting the existence of a leak. In addition, the ability to easily adjust such systems for various rates of leakage has not been addressed.

SUMMARY OF THE INVENTION

It is an object of the present invention to provide a novel leak detection method and apparatus for fluids in a piping system.

It is another object of the present invention to provide a leak detection apparatus which is inexpensive to manufacture.

It is yet another object of the present invention to provide a leak detection apparatus which is sensitive to a wide range of leakage flow-rate conditions.

Another object of the present invention is to provide a leakage detection method and apparatus which is sensitive to very small leakage flow rates.

A further object of the present invention is to provide a leakage detection apparatus which may be easily adjusted to monitor for various minimum rates of leakage.

A still further object of the present invention is to provide a leakage detection apparatus which may be easily installed by a home owner for detecting leaks throughout the home water system.

Another object of the present invention is to provide a leakage detection apparatus and method for assisting in conservation of water resources.

In satisfaction of these and related objectives, Applicant's present invention provides a method and apparatus for detecting the presence of leaks in a piping system which is sensitive to very small leakage flow-rates and can be easily adjusted to monitor leakage rates over a wide range. The apparatus directed toward the present invention is inexpensive to manufacture, uses commonly available parts, and is easily installed. A single sensing element, such as a thermistor, is required for leak detection, obviating the need for matched components or multi-element bridges.

DESCRIPTION OF THE PREFERRED EMBODIMENT

Figure 1:
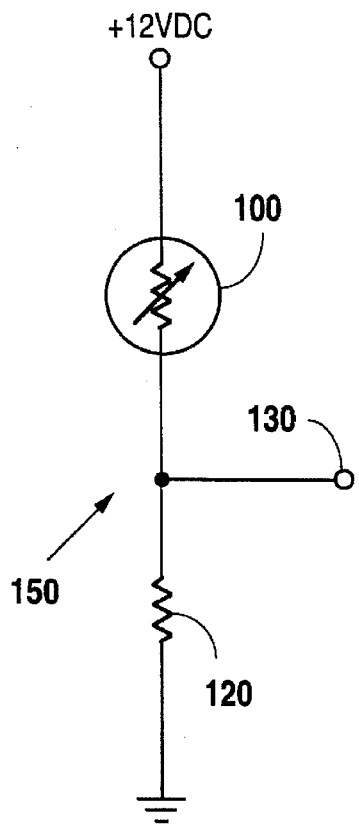
FIG. 1 is a schematic diagram of the underlying electrical principle upon which leak detection in the present invention is based.

Turning now to FIG. 1, it can be seen that the leak sensing circuit (150) can be generally described as a voltage divider. A positive-valued and regulated DC voltage is applied to one side of a thermistor (100). The other side of thermistor (100) is joined to a fixed resistance (120) at sensing junction (130). The other side of fixed resistance (120) is connected to ground potential, so that the positive-valued voltage applied to the thermistor (100) is divided between thermistor (100) and fixed resistance (120) in proportion to the value of resistance for each element divided by the sum of their resistances. As the resistance of thermistor (100) changes, based on a change in temperature surrounding thermistor (100) and its own self-heating action, the voltage present at sensing junction (130) will also change. If thermistor (100) is placed within a fluid reservoir, the voltage present at sensing junction (130) will then depend on the temperature of the reservoir.

Figure 2:
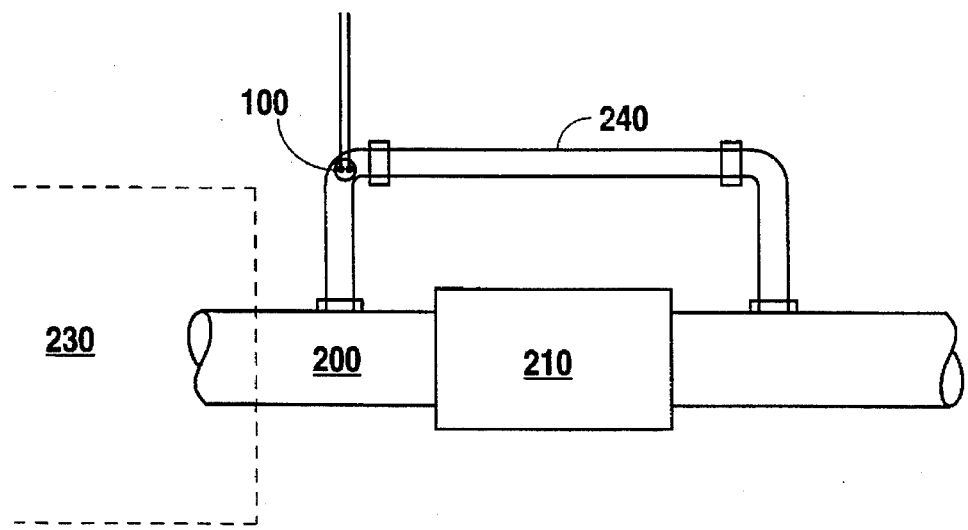
FIG. 2 depicts a typical installation of the leak detection apparatus sensor element.

Turning now to FIG. 2, the installation of thermistor (100) in a residential water supply system is shown. Main water line (200) originates at water meter (230) and passes through check valve (210). To install the sensing element, thermistor (100), a home owner bypasses the check valve (210) using a bypass tube (240). In the preferred embodiment, bypass tube (240) would be of approximately ¼ inch in diameter, and the water main tubing diameter would range from approximately ¾ inch to 1½ inch.

Under normal conditions, when the thermistor is placed within the bypass tube (240), and no water flows through the main line, the temperature surrounding the thermistor (100) is relatively constant. However, if a leak develops, water will flow past thermistor (100), causing a reduction in surface temperature as heat is transported away from thermistor (100). This cooling effect causes a change in the resistance of thermistor (100), which in turn produces a change in the voltage present at sensing junction (130). Placing thermistor (100) into a small-diameter tube to bypass check valve tube (210), instead of directly into main water line (200), results in a much more sensitive detection system. Normally, a few ounces of water pressure is required to open check valve (210). Using the bypass tube allows the thermistor to be cooled by even very small leaks, e.g. on the order of one drop per second from a single faucet. Of course, the more water that flows past thermistor (100), the greater the voltage present at sensing junction (130), assuming that a positive temperature coefficient thermistor is used.

Figure 3:
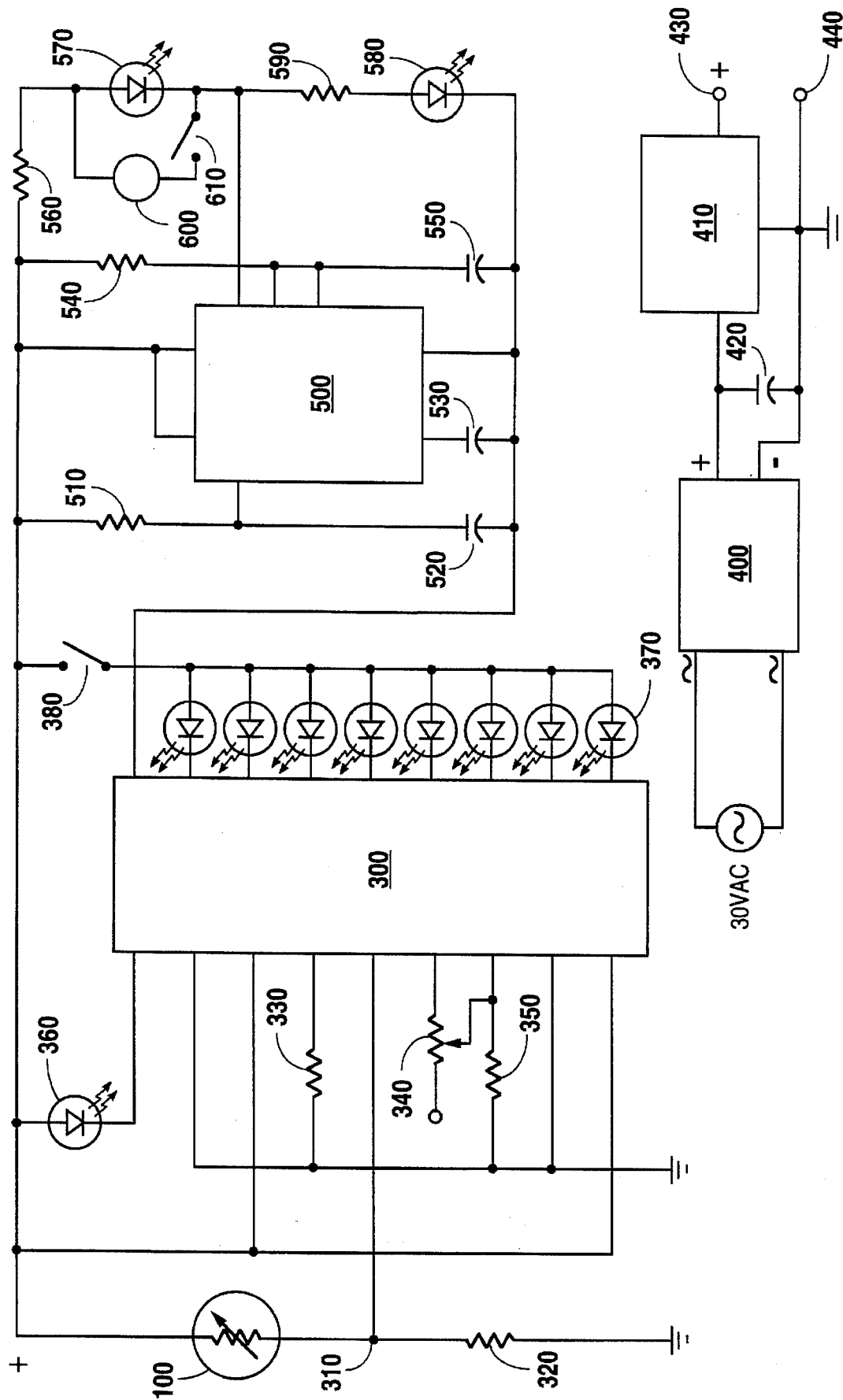
FIG. 3 is an electrical circuit diagram for the preferred embodiment of the leak detection apparatus.

Turning now to FIG. 3, the preferred embodiment of a portion of the invention which is used for translating the electrical signal from the leak sensor (thermistor (100)) into a visual and audible signal is shown as a schematic diagram. Of course, many other embodiments may be implemented, and any means of visual and/or audio indication can be used to satisfactorily implement the present invention. For example, an analog-to-digital converter can be used to measure the voltage generated by thermistor (100) and provide a digital read-out using an appropriate display driver.

In this simplified implementation, some source of DC voltage is required to power the leakage sensing and indication circuitry. Here, 30 VAC is applied to the alternating input of bridge rectifier (400). Rectified output voltage is passed along to smoothing capacitor (420) and on into voltage regulator (410) (integrated circuit type LM7812, or device with similar characteristics). The end result is a positive and regulated voltage (in this case 12 VDC) provided at a positive voltage terminal (430), and available to power the rest of the circuit. Ground potential is likewise available at ground terminal (440).

Assuming that regulated DC voltage is available for application to the leakage sensor and other circuit components, this voltage can be applied across the combination formed by signal input resistor (320) and thermistor (100). One side of resistor (320) is connected to the ground terminal (440) and one side of thermistor (100) is connected to positive terminal (430). The remaining open terminals of signal input resistor (320) and thermistor (100) are connected together so as to form a signal input junction (310), which is in turn connected to the signal input terminal of display driver integrated circuit (300) (integrated circuit type LM555, or device with similar characteristics). Display driver integrated circuit (300) is used to drive an LED bar graph (370) based on the level of the voltage present at signal input junction (310). In this case, signal input resistor (320) serves exactly the same function as fixed resistance (120) in FIG. 1. Similarly, signal input junction (310) is analogous to sensing junction (130) in FIG. 1.

Display driver integrated circuit (300) compares the voltage present at signal input junction (310) to a reference voltage, and will illuminate a number of LEDs in a bar graph type display, the number of LEDs turned on is proportional to the amount of voltage present at signal input junction (310). Low side divider span resistor (330) (valued at 51 kΩ) is used to set the lower range of voltage at which display driver integrated circuit (300) will begin to indicate leakage. Likewise, sensitivity control potentiometer (valued at 50 kΩ) can be used to set the span voltage range over which the LED bar graph (370) will operate. Brightness resistor (350) (valued at 1 kΩ) is used to set the brightness level of all LEDs in the LED bar graph (370), as they are turned on by display driver integrated circuit (300). Bar graph switch (380) is used to turn off the LED bar graph (370) when not desired by the user.

Sensitivity adjustment LED (360) is used to indicate the leak detection threshold, and is connected so as to be illuminated as the "first" LED of LED bar graph (370). Sensitivity adjustment LED (360) is used to monitor a desired drip rate (e.g. when a faucet is left on for pets, plants, etc.) and as a "pilot light" that indicates the system is set to detect leaks. Sensitivity adjustment LED (360) also assists in adjusting the leak detection system overall sensitivity. As mentioned earlier, LED bar graph (370) will have one or more LEDs lighted for increasing amounts of voltage present at signal input junction (310), caused by increased leakage rate as sensed by thermistor (100).

When fluid leaks above a predetermined rate, as sensed by thermistor (100), this signal is processed by display driver integrated circuit (300) and passed on to timer integrated circuit (500) (similar to integrated circuit type LM555). Timer integrated circuit (500) is set up to operate as a monostable element. In this mode of operation, the timer integrated circuit functions as a one-shot. Upon application of a negative trigger pulse which is less than ⅓ of the supply voltage to the timer's trigger input, an internal flip-flop is set, which releases the short circuit across timing capacitor (550) (valued at 1000 μF). The output of the timer integrated circuit (500) is driven high at this point, which results in passing current through sense LED current limit resistor (590) (valued at 330 Ω) and sense LED (580), which is illuminated whenever any leak above the minimum threshold set by sensitivity control potentiometer (340) is exceeded. The voltage across timing capacitor (550) increases exponentially for a period of time equal to 1.1 times the product of the values of timing resistor (540) and timing capacitor (550). At the end of this time, the output voltage equals ⅔ of the value present at positive voltage terminal (430). The internal flip-flop of timer integrated circuit (500) is reset at this time, which in turn discharges timing capacitor (550) and drives the output of timer integrated circuit (500) to a low state. In this case, the values of timing resistor (540) and timing capacitor (550) have been chosen to produce a time period of about thirty minutes. Control voltage capacitor (530) (valued at 0.01 μF) is used to set the control voltage input to timer integrated circuit (500) at ⅔ of the value present at positive voltage terminal (430). The value of this voltage directly affects the set and reset timing of the internal flip-flop for timer integrated circuit (500).

If the voltage present at the trigger input to timer integrated circuit (500) is less than ⅓ of that present at positive voltage terminal (430) for more than thirty minutes (indicating the presence of an undesired leak), then sufficient current will be passed through detect LED current limit resistor (valued at 330 Ω) and detect LED (570) so as to turn on detect LED (570). Depending on the position of piezo buzzer switch (610), piezo buzzer (600) may also be activated at this time. In any case, such an active condition indicates the presence of an unwanted leak due to increased fluid flow past thermistor (100) over an extended period of time.

Figure 4:
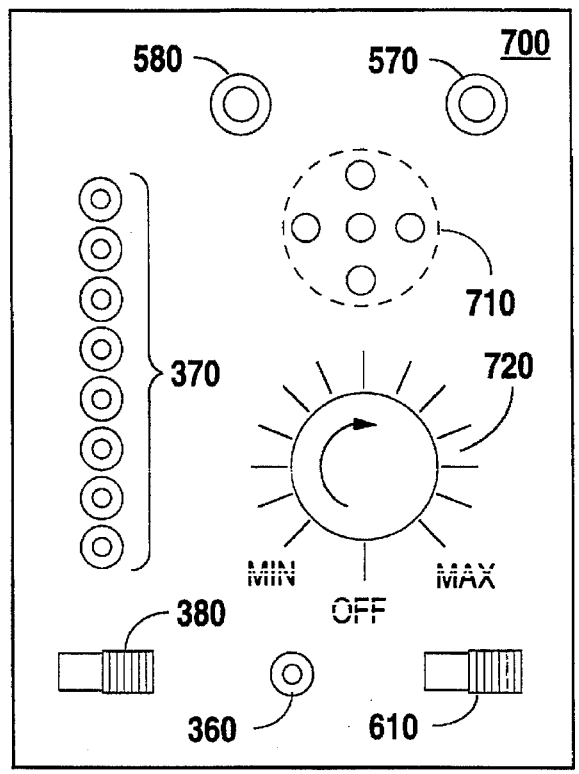
FIG. 4 depicts a front panel view of a packaged version of the leak detection apparatus.

Turning now to FIG. 4, the process of calibrating the leak detector can be explained. After installation of thermistor (100) into bypass tube (240), the system user will advance sensitivity adjustment knob (720) from the off position to some nominal value which results in activation of sensitivity adjustment LED (360). At this time, it is assumed that all water in the residence is shut off. A single faucet may now be turned on by the residential user and set to a leak rate at which operation of the detector is desired. For example, a leak rate of one drop per second is acceptable. The sensitivity adjustment knob (720) is now advanced past the minimum position at which sensitivity adjustment LED (360) illuminates until sense LED (580) is activated. If the sensitivity control potentiometer (340) is moved too far past this position, LED bar graph (370) will begin to light up. Now the dripping faucet should be turned off. Sense LED (580) will be deactivated, while sensitivity adjustment LED (360) remains active. If the nominal detection level was set using a desired drip flow rate, sensitivity adjustment LED (360) will also be extinguished if the dripping faucet is shut off. Sensitivity adjustment LED (360) thus performs the function of preventing inadvertent reduction of sensitivity to the point where no leak is detected. Bar graph switch (380) may be switched on or off as well as piezo buzzer switch (610), according to the operator's needs. Piezo buzzer (600) is located behind piezo buzzer grille (710) in this illustration, which shows the leak detector apparatus front panel (700).

The leak detection system operates in the following manner. Once the sensitivity of the apparatus has been set, as described above, any leak flow rate equal to or greater than the preset rate will cause sense green LED (580) to be turned on. If the leak continues for the preset time (in this embodiment, approximately thirty minutes), the sense LED 580 will be extinguished and the detect high intensity red, flashing LED (570) will be activated. In addition, piezo buzzer (600) will also be activated, if piezo buzzer switch (610) is closed so that power can be applied to piezo buzzer (600). LED bar graph (370) will indicate the relative size of the leak if it is enabled by bar graph switch (380). Every time residential water is used in a normal fashion, sense LED (580) will be activated (washing machine, ice maker, commode flush, shower, etc.). This will produce an awareness on the part of the home owner that water is being used, but will not activate the detect LED (570) and piezo buzzer (600). If a small leak occurs, such as a faucet dripping, and the home owner wishes to ignore it, sensitivity control potentiometer (340) can be adjusted to a slightly greater value using the sensitivity adjustment knob (720) so that detect LED (580) is extinguished. Now the apparatus will continue to monitor for any leak rate larger than that already existing.

It should be obvious to those skilled in the art that a single positive temperature coefficient thermistor can be used, but other common sensors capable of generating a variable voltage responsive to fluid flow thermal transport phenomena may be used. The instant invention is easy to install. Thermistor (100) can be placed at any point along main water line (200), and requires only two wires from thermistor (100) to be connected to the balance of the leak detection system. The instant invention is sensitive enough to detect a leak of less than one drop per second using a ¼ inch diameter bypass tube (240). A bypass tube (240) of ⅛ inch in diameter would provide additional sensitivity if needed. This apparatus also allows the operator to select a particular flow rate of leakage to monitor, so that purposeful leakage (faucet left dripping for pets, birds, plants, etc.) is possible. Use of sense LED (580) allows the operator to remain cognizant of water usage, while detect LED (570) and piezo buzzer (600) are easily noticed as an alarm condition. Also, piezo buzzer (600) functions as an alarm condition for blind people. Finally, the user or operator may readjust system sensitivity to monitor for larger flow rates than that first detected, providing for later repair of a very small leak and continued system operation.

I claim:

1. An apparatus for detecting downstream leakage in a piping system comprising:
   a flowmeter, said flowmeter comprising;
   a check valve, said check valve for preventing backflow of a fluid carried in said piping system;
   a bypass tube, said bypass tube positioned across said check valve and having a fluid flow capacity small relative to a fluid flow capacity in said piping system;
   a flow rate sensor, said sensor positioned in association with said bypass tube and in thermal contact with said fluid carried by said piping system, said sensor located upstream from said leakage in said piping system, said sensor producing a voltage proportional to a flow rate of said fluid past said sensor, said voltage due to heat lost to said fluid from said sensor;
   a controller/display unit, said controller/display unit comprising;
   a flow rate display, said display producing a visual signal responsive to changes in said voltage;
   a sensitivity control, said control operable to set a flow rate value below which said display is disabled; and
   an alarm, said alarm active when said flow rate value is exceeded for a preset time period.

2. The apparatus for detecting downstream leakage in a piping system of claim 1, wherein said alarm consists of a visual indicator.

3. The apparatus for detecting downstream leakage in a piping system of claim 1, wherein said alarm consists of an aural indicator.

4. The apparatus for detecting downstream leakage in a piping system of claim 1, wherein said sensitivity control consists of a single potentiometer.

5. The apparatus for detecting downstream leakage in a piping system of claim 1, wherein said sensor consists of a single thermistor.

6. The apparatus for detecting downstream leakage in a piping system of claim 1, wherein said flow rate display comprises a flow active indicator and a flow rate indicator, wherein said flow active indicator is on whenever said flow rate value is exceeded and said flow rate indicator is progressively activated as said flow rate value increases.

7. A method of detecting a downstream leak in a piping system having a check valve installed to prevent backflow of fluid carried by said piping system, said method comprising the steps of:

installing a bypass tube across said check valve, said bypass tube having; a fluid flow capacity small relative to a fluid flow capacity in said piping system;

installing a sensing element within said bypass tube, such that a fraction of said fluid carried by said piping system flows past said sensing element;

monitoring a voltage produced by said sensing element, said voltage proportional to a rate of flow of said fluid within said bypass tube;

activating a flow active indicator whenever said voltage exceeds a preset nominal value, said preset nominal value produced when said rate of flow of said fluid past said sensing element is equal to a minimum detectable leak flow rate desired;

progressively activating a flow rate indicator whenever said voltage exceeds said preset nominal value, said flow rate indicator progressively activated as said flow rate increases;

measuring an amount of time during which said voltage continuously exceeds said preset nominal value; and activating an alarm whenever said measured amount of time exceeds a preset time interval, said preset time interval greater than an amount of time normally required for non-leakage generated flow within said piping system.

\* \* \* \* \*